United States Patent
Mohmedi

(10) Patent No.: US 10,241,487 B2
(45) Date of Patent: Mar. 26, 2019

(54) CONTROL SYSTEM FOR WASHROOM DEVICES

(71) Applicant: M.I.S. Electronics Inc., Richmond Hill (CA)

(72) Inventor: Saeid Mohmedi, Richmond Hill (CA)

(73) Assignee: M.I.S. ELECTRONICS INC., Richmond Hill (CA)

( * ) Notice: Subject to any disclaimer, the term of this patent is extended or adjusted under 35 U.S.C. 154(b) by 140 days.

(21) Appl. No.: 15/104,871

(22) PCT Filed: Dec. 16, 2013

(86) PCT No.: PCT/CA2013/050970
§ 371 (c)(1),
(2) Date: Jun. 15, 2016

(87) PCT Pub. No.: WO2015/089624
PCT Pub. Date: Jun. 25, 2015

(65) Prior Publication Data
US 2016/0313712 A1     Oct. 27, 2016

(51) Int. Cl.
| | |
|---|---|
| *G05B 15/02* | (2006.01) |
| *G05B 19/042* | (2006.01) |
| *G05D 7/06* | (2006.01) |
| *A47K 5/12* | (2006.01) |
| *A47K 10/48* | (2006.01) |
| *E03C 1/05* | (2006.01) |
| *E03D 7/00* | (2006.01) |

(52) U.S. Cl.
CPC .......... *G05B 19/042* (2013.01); *A47K 5/1217* (2013.01); *A47K 10/48* (2013.01); *E03C 1/057* (2013.01); *G05B 15/02* (2013.01); *G05D 7/0629* (2013.01); *E03D 7/00* (2013.01); *G05B 2219/2642* (2013.01); *G05B 2219/31262* (2013.01)

(58) Field of Classification Search
CPC ........ G05D 7/0635; G05B 2219/24146; G05B 2219/2642
USPC ................... 700/12, 19, 281, 282, 283, 275
See application file for complete search history.

(56) References Cited

U.S. PATENT DOCUMENTS 5,217,035 A * 6/1993 Van Marcke ........... E03C 1/057
                                                            137/1
2011/0316703 A1* 12/2011 Butler .................. G08B 21/245
                                                          340/573.1

FOREIGN PATENT DOCUMENTS

| CA | 2776856 A1 | 11/2013 |
| JP | 2006-322639 A | 11/2006 |

\* cited by examiner

*Primary Examiner* — Michael J Brown
(74) *Attorney, Agent, or Firm* — Elan IP Inc.

(57) ABSTRACT

A system for controlling a plurality of devices in a public washroom facility having a controller with an integrated circuit including at least one logic block providing one or more predetermined control instructions to one or more of the plurality of devices via at least one control block; the at least one control block defining a communication interface between the integrated circuit and the plurality of devices; at least one communication block receiving data from a communications interface for programming the integrated circuit to modify the one or more predetermined control instructions.

16 Claims, 1 Drawing Sheet

CONTROL SYSTEM FOR WASHROOM DEVICES

FIELD OF THE INVENTION

The invention relates generally to control and automation systems, and more particularly to a control system including an integrated circuit adapted to control various devices and functions of a public washroom.

BACKGROUND OF THE INVENTION

Automatic faucets that control the flow of water by sensing the presence of an object close to the faucet have been widely available in the market for many years. Similarly, automatic soap dispensers, hand dryers and other devices have been independently implemented in various ways. However, these devices act, and are otherwise controlled independently, in prior art systems.

Furthermore, there is a lack in the prior art of suitable full-room control systems that permits various devices and functions affecting the use of public washrooms to be controlled in a coordinated manner. This type of coordination may be beneficial for various purposes, including improved sanitary conditions, more efficient power consumption, and ease of use by users and janitorial staff alike. systems.

Finally, prior art devices tend to lack the ability to adjust parameters or functions in real-time, or to configure additional features as the tendency has been towards printed circuit board (PCB) control of a number of discrete components in public washrooms. Changes to the operating functions, and with particular respect to the control functions, require a change in the PCB, or a replacement of the particular component itself.

In view of one or more of these problems, there is a need in the art for improved systems and methods for controlling public washrooms and related devices.

SUMMARY OF THE INVENTION

It is an object of the invention to solve one or more of the above identified problems with the prior art. Accordingly, in one embodiment of the invention, there is provided a system for controlling a plurality of devices in a public washroom facility having a controller with an integrated circuit including at least one logic block providing one or more predetermined control instructions to one or more of the plurality of devices via at least one control block; the at least one control block defining a communication interface between the integrated circuit and the plurality of devices, and at least one communication block receiving data from a communications interface for programming the integrated circuit to modify the one or more predetermined control instructions.

According to one aspect of this embodiment, the plurality of devices comprises one or more selected from the group consisting of a water faucet, a soap dispenser, a heating device, a cooling device, automated doors and dryers.

According to another aspect of this embodiment, there is provided at least one timing block adapted to calibrate the instructions provided by the at least one logic block.

According to another aspect of this embodiment, there is provided a computing device having a central processor in communication with the communications interface for modifying the one or more predetermined control functions.

According to another aspect of this embodiment, the communications interface is selected from the group consisting of an electrical interface, an optical interface and a wireless communications interface.

According to another aspect of this embodiment, the predetermined instructions are based on equipment specifications of the plurality of devices.

According to another aspect of this embodiment, the predetermined control instructions include instructions for sequentially initiating operation of each of the plurality of devices in order of their anticipated use and for predetermined periods of time.

According to another aspect of this embodiment, each of the communication block is adapted to receive instructions modifying the predetermined periods of time.

According to another aspect of this embodiment, the communication block is adapted to receive instructions in respect of one or more additional devices.

According to a second embodiment of the invention, there is provided a method for controlling a plurality of devices in a public washroom facility including providing via at least one logic block one or more predetermined control instructions to one or more of the plurality of devices via at least one control block; defining via the at least one control block a communication interface between the integrated circuit and the plurality of devices; wherein the at least one logic block and the at least one control block are provided on an integrated circuit; and receiving data from a communications interface for programming the integrated circuit to modify the one or more predetermined control instructions.

According to one aspect of this embodiment, the plurality of devices comprises one or more selected from the group consisting of a water faucet, a soap dispenser, a heating device, a cooling device, automated doors and dryers.

According to another aspect of this embodiment, the method further comprises calibrating via at least one timing block the instructions provided by the at least one logic block.

According to another aspect of this embodiment, the method further comprises modifying the one or more predetermined control functions.

According to one aspect of this embodiment, the communications interface is selected from the group consisting of an electrical interface, an optical interface and a wireless communications interface.

According to one aspect of this embodiment, the predetermined instructions are based on equipment specifications of the plurality of devices.

According to one aspect of this embodiment, the predetermined control instructions include instructions for sequentially initiating operation of each of the plurality of devices in order of their anticipated use and for predetermined periods of time.

According to one aspect of this embodiment, each of the communication block is adapted to receive instructions modifying the predetermined periods of time.

According to one aspect of this embodiment, the communication block is adapted to receive instructions in respect of one or more additional devices.

DETAILED DESCRIPTION

In one embodiment of the invention there is provided a integrated circuit board (such as an ASIC board) adapted to generate a set of control signals to control a set of public washroom devices or features relating to such devices to permit coordinate operation and/or to permit real-time configuration and functional updates.

Figure 1:
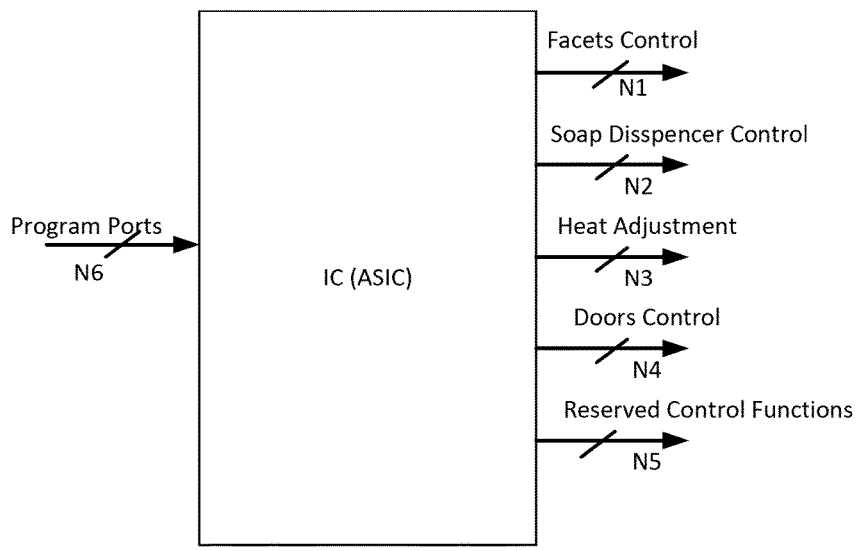
FIG. 1 is a schematic view of an integrated circuit according to one embodiment of the invention.

Referring now to FIG. 1, there is shown an embodiment of the invention wherein a integrated circuit 10 includes an input port N6 for programming the integrated circuit, or otherwise for updating its operation or stored parameters. A number of control signals are provided in the form of outputs from the integrated circuit labeled as N1-N5 for controlling various components and functions used in public washrooms. For example, in the illustrated embodiment, faucets, soap dispensers, heating/cooling, and access doors are controlled. In addition, a reserved control output is illustrated to provide for future considerations. Any number of control signals may be generated and invention contemplates additional elements to control other than those explicitly recited herein.

The programming channel or port N6 is generally used to adjust features of the integrated circuit after installation, as well as to enable, configure and to program reserved additional control functions. The programming channel N6 can be electrically connected with the integrated circuit, or may alternatively use a wireless communication protocol or any other means known for updating parameters or programming integrated circuits such as optical protocols, power line communication, etc. The implementation of such an integrated circuit permits for universal low-power, space efficient and multi-functional solutions with post-installation programming capabilities that has heretofore been unknown in the prior art. The invention contemplates using the integrated circuit logic to provide all or the majority of functions to control controllable elements of a public washrooms. In addition, subsequent calibration of elements is also contemplated.

Figure 2:
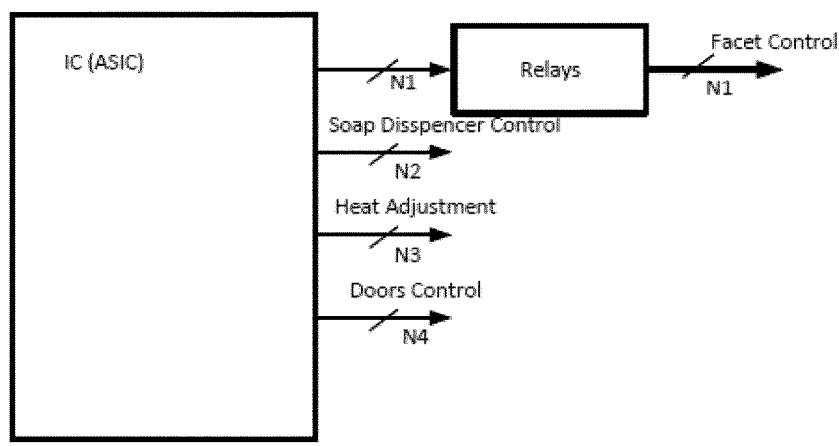
FIG. 2 is a schematic view of another integrated circuit according to another embodiment of the invention.

FIG. 2 presents a simplified version of the embodiment of FIG. 1. This implementation can be used where there are no plans for further integrated circuit performance adjustment. A limited number of external devices may be needed if a device under control must have control signals that the integrated circuit alone is not able to provide. While this situation is rare, it can be accommodated using the embodiment shown in FIG. 3. For example, if the integrated circuit can provide electrical signals at a maximum of 3V, but the device under control needs a higher voltage electrical signal, such as 15V, then external signal transducers may be used.

The integrated circuit as illustrated may have an embedded or an external microcontroller to facilitate programming or parameter updates. The microcontroller would typically be in communication with at least one internal logic block configured to provide a set of control functions to an external device under control, via outputs N1-N5. At least one internal control block is configured to provide one or more communication interfaces between the integrated circuit and respective external devices being controlled. Finally, at least one internal communication block is configured to provide at least one communication interface to be used to program the integrated circuit.

Optionally, a calibration block may also be provided to implement calibration of the multiple control functions, for example in respect of timing, delay, etc.

While the external devices being controlled are not herein described in much detail, the functioning of these will be known to one skilled in the art, and are readily available as off-the-shelf devices. The invention relates to the controller using an integrated circuit as herein described and is independent of the individual functioning of each of each of the devices being controlled.

When implemented in practice, the integrated circuit as discussed above enables the coordinated control of various public washroom devices, including but not limited to, water faucets, soap dispensing, hand dryers, heating and/or cooling, and door controls.

In particularly preferred embodiments, various sensors will also be implemented that are commonly known in the art, but heretofore associated with particular washroom devices in isolation. The processing of sensor information is known in the art, and therefore is not described herein in further detail. However, the integrated circuit may make use of various sensor information and data as received from sensors associated with the individual components in the public washroom.

In particular implementations, the integrated circuit as herein described would receive information from a door sensor that a user is approaching the entrance to the public washroom. In response to this, doors could automatically be opened, followed by initiating a heating/cooling function to bring the washroom to an internal temperature appropriate for a user. This is particularly useful and beneficial in small washrooms, or single-user automated public washrooms, where touch free operation preserves cleanliness of the facility. Once a user has used the washroom, the flushing function of the toiled is automatically initiated, followed by a timed delay after which soap is dispensed for the user and water is run from the faucet. A hand dryer function would then be initiated, or less preferably, dispensing of paper towels for drying the hands. Optionally, instructions could be provided in respect of timing between the operation of various facilities of the automated public washroom. This option eliminates the need for sensors, except on the doors, provided users are able to make use of the facilities based on the instructions provided.

Of specific advantage to the invention as embodied by the integrated circuit herein described is the ability to update process parameters or functioning of each of the individual components at the central controller. For example, programming can be updated to alter the timing sequence between various operations as mentioned above, or to update the order of events taking place. The ability to reprogram the controller by treating the public washroom as a single unitary entity is an improvement over the prior art, and is particularly beneficial for single-pod type public washrooms, such as those that are coin operated.

Indeed, the invention permits complete automation from door opening, through to complete use of these types of coin operated public washrooms as has not been made possible in the prior art. This is enabled by virtue of the integrated circuit controller discussed above, which when implemented to control the public washroom as herein described leads to this functionality. Finally, the programming ports allow for adjustments to be made based on time of day, time of year or during special events when a higher throughput of users may be required through the public washroom, such as a coin operated washroom. In these instances, the single controller provides particular advantages and functional updates can be made in real-time to facilitate efficient use of these washrooms.

The integrated circuit controller may be programmed via communication with a typical computer system including a central processing unit and computer readable media such as random access memory and hard disk drives which store computer executable instructions that enable remote or wired updating of the programming of the integrated circuit. Such computer systems are known in the art and are not described in further detail herein. Nevertheless, it is contemplated that any variety of computer systems, including but not limited to, desktop computers, mobile devices, tablet computers and others may be used to complete this task.

While various steps and computer components have been herein used, these are to be given their ordinary definition as would be known in the art, unless explicitly limited or otherwise herein defined. The above-described embodiments are intended to be examples of the present invention and alterations and modifications may be effected thereto, by those of skill in the art, without departing from the scope of the invention that is defined solely by the claims appended hereto.

We claim:

1. A system for controlling a plurality of devices in a public washroom facility having a controller with an integrated circuit comprising:
    at least one logic block providing one or more predetermined control instructions to one or more of the plurality of devices via at least one control block;
    said at least one control block defining a communication interface between the integrated circuit and the plurality of devices;
    at least one communication block receiving data for programming the integrated circuit to modify said one or more predetermined control instructions;
    wherein said plurality of devices comprises one or more selected from a group consisting of a water faucet, a soap dispenser, a heating device, a cooling device, automated doors and dryers and wherein said control instructions include instructions to initiate a heating/cooling function to bring the public washroom to an internal temperature appropriate for a user in response to receiving information from a door sensor on said automated doors that the user is approaching.

2. The system according to claim 1, further comprising at least one timing block adapted to calibrate the instructions provided by said at least one logic block.

3. The system according to claim 1, further comprising a computing device having a central processor in communication with said communications interface for modifying said one or more predetermined control functions.

4. The system according to claim 3, wherein said communications interface is selected from the group consisting of an electrical interface, an optical interface and a wireless communications interface.

5. The system according to claim 1, wherein said predetermined instructions are based on equipment specifications of said plurality of devices.

6. The system according to claim 1, wherein said predetermined control instructions include instructions for sequentially initiating operation of each of said plurality of devices in order of their anticipated use and for predetermined periods of time.

7. The system according to claim 6, wherein each of said communication block is adapted to receive instructions modifying said predetermined periods of time.

8. The system according to claim 6, wherein said communication block is adapted to receive instructions in respect of one or more additional devices.

9. A method for controlling a plurality of devices in a public washroom facility comprising:
    providing via at least one logic block one or more predetermined control instructions to one or more of the plurality of devices via at least one control block;
    defining via said at least one control block a communication interface between an integrated circuit and the plurality of devices;
    wherein said at least one logic block and said at least one control block are provided on an integrated circuit;
    receiving data for programming the integrated circuit to modify said one or more predetermined control instructions;
    wherein said plurality of devices comprises one or more selected from a group consisting of a water faucet, a soap dispenser, a heating device, a cooling device, automated doors and dryers and wherein said control instructions include instructions to initiate a heating/cooling function to bring the public washroom to an internal temperature appropriate for a user in response to receiving information from a door sensor on said automated doors that the user is approaching.

10. The method according to claim 9, further comprising calibrating via at least one timing block the instructions provided by said at least one logic block.

11. The method according to claim 9, further comprising modifying said one or more predetermined control functions.

12. The method according to claim 11, wherein said communications interface is selected from the group consisting of an electrical interface, an optical interface and a wireless communications interface.

13. The method according to claim 9, wherein said predetermined instructions are based on equipment specifications of said plurality of devices.

14. The method according to claim 9, wherein said predetermined control instructions include instructions for sequentially initiating operation of each of said plurality of devices in order of their anticipated use and for predetermined periods of time.

15. The method according to claim 14, wherein each of said communication block is adapted to receive instructions modifying said predetermined periods of time.

16. The method according to claim 14, wherein said communication block is adapted to receive instructions in respect of one or more additional devices.

* * * * *